Patented Nov. 29, 1932

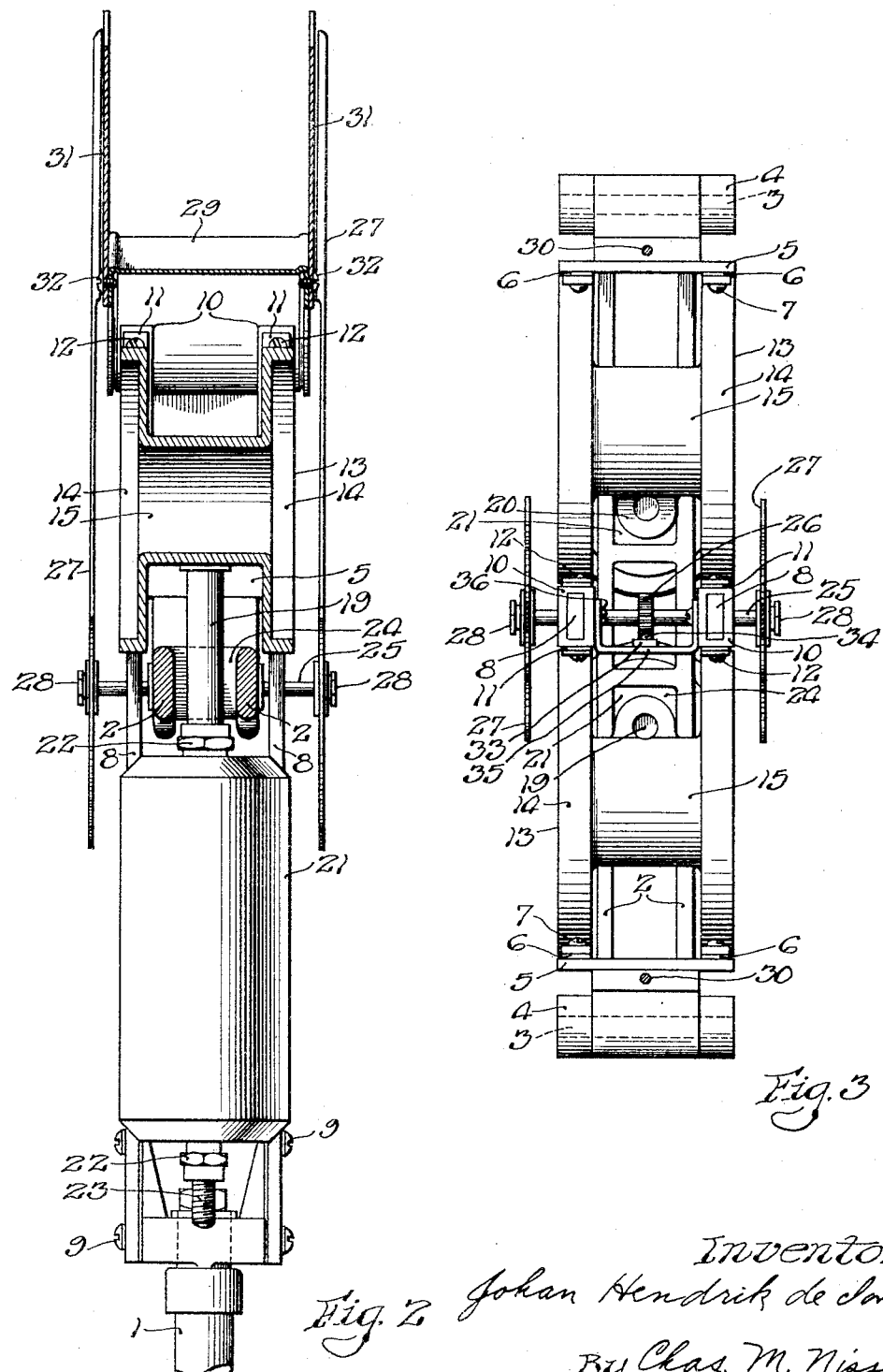

1,888,979

UNITED STATES PATENT OFFICE

JOHAN HENDRIK DE IONGH, OF WASSENAAR, NETHERLANDS, ASSIGNOR TO NAAM-LOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

WEIGHING APPARATUS

Application filed September 24, 1929, Serial No. 394,933, and in Great Britain October 10, 1928.

This invention relates to weighing apparatus and pertains to indicating mechanism of the type which comprises a pair of load counter-balancing devices.

One of the objects of the present invention is to provide a generally improved construction and arrangement of such indicating mechanism.

Another object of the invention is to provide an indicating mechanism which comprises rockable members which support pendulous weights and are themselves supported by means of flexible elements attached to various parts of the weighing mechanism. Preferably I provide flexible elements which extend upwardly from the rockable member and these flexible elements are attached to movable and stationary parts of the weighing mechanism. If desired, I may only use a single flexible element extending upwardly at both sides of each rockable member.

Another object of the invention is to provide a counter-balancing mechanism which is so arranged that the weights always bear such a relationship to the remainder of the apparatus that the center of gravity of said weights is located between the separate parts to which the flexible elements are attached.

A further object of this invention is the provision of an indicating mechanism operated by the movement of the members which actuate the rockable members under the influence of a load.

A still further object of this invention is to provide a device in which the pendulous weights are so arranged that they may be displaced vertically for the purpose of adjustment when the apparatus is fully loaded.

Referring to the drawings:—

Fig. 2 is a cross-section on the line 2—2 of Fig. 1; and

Fig. 3 is a plan view of the parts shown in Fig. 1.

Figure 1:
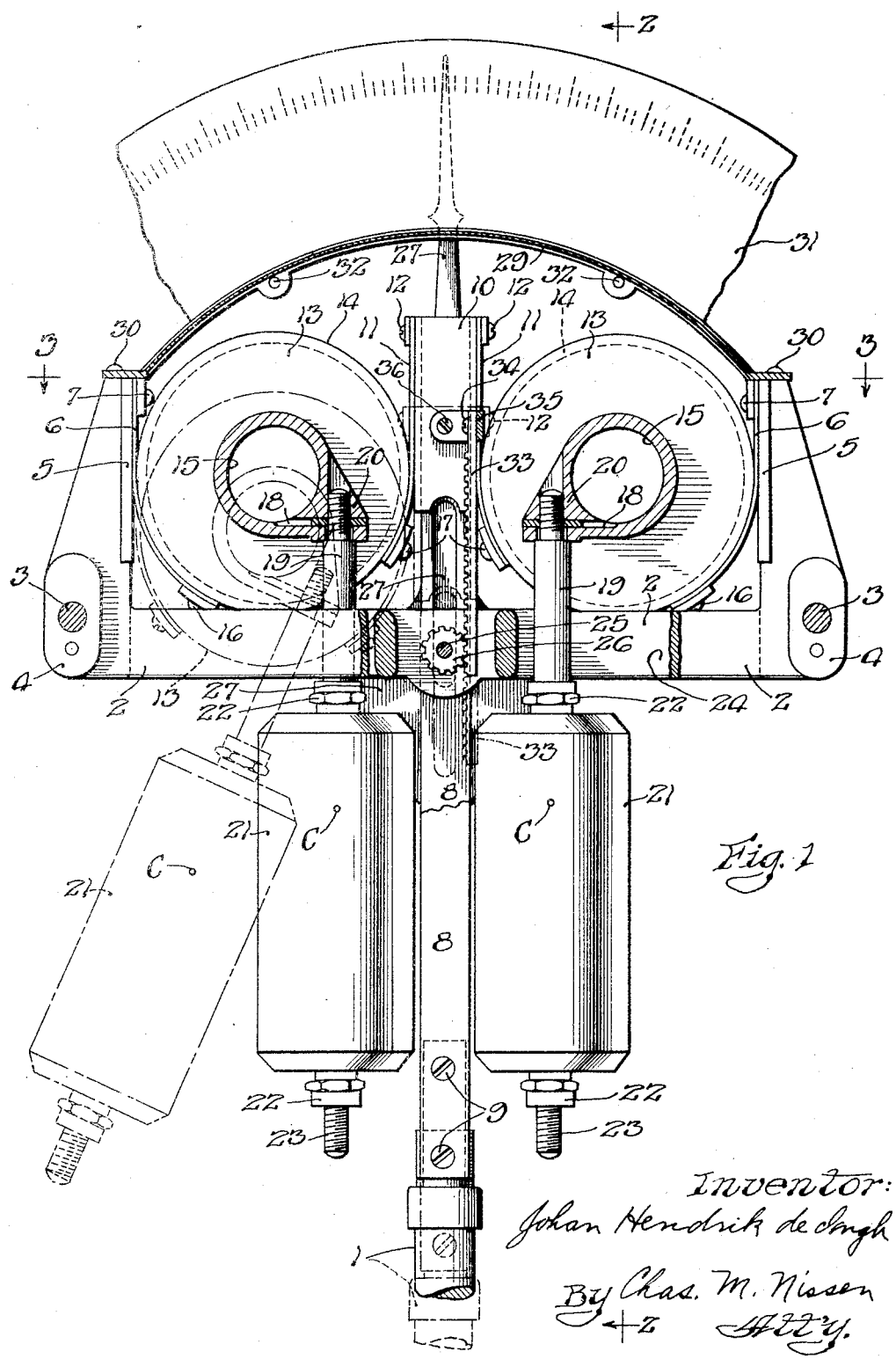
Fig. 1 is an elevational view of the counterbalancing means for a weighing apparatus of the type described and the indicating means therefor.

Since this invention is not limited in its use to any particular type of weighing mechanism, I have shown only the counter-balancing mechanism and the indicating means which comprise my invention.

Referring now to the drawings in detail: 1 indicates the operating member which is adapted to be attached to a movable part of the weighing mechanism, the amount of movement of this member depending upon the load placed upon the scale platform of the weighing mechanism. A substantially U-shaped member 2 is fixed to the frame of the weighing mechanism by means of bolts 3 passing through lugs 4 of the U-shaped member. Guide plates 5 are provided on the opposite legs of the U-shaped member. Flexible elements 6, preferably made of steel, are fastened adjacent the upper edges of the guide plates by means of screws 7 or the like. The operating member 1 has upwardly extending members 8 rigidly fastened thereto by means of screws 9 or the like and the members 8 carry the sleeves 10 at their upper ends. Each of these sleeves 10 has a flexible element 11 fastened thereto by means of screws 12.

Interposed between the guide plates 5 and the sleeves 10 are a pair of spool-shaped members 13 each having two outer substantially cylindrical guiding members 14 and a hub portion 15. Each of the flexible elements 6 and 11 are fastened to the adjacent cylindrical guiding surfaces 14 of the spool-shaped members by means of screws 16 and 17, respectively. Each of the hub portions 15 is split as at 18 and a stem 19 is screw-threaded into one portion 20 thereof and passes freely through the other portion thereof. This forms a means whereby the stem 19 is firmly connected to the hub portion. A weight 21 surrounds each of the stems 19 at their lower ends and both weights are adjustable longitudinally of the stems by means of the nuts 22 located at the opposite ends of the weights, the stem 19 being provided with a screw-threaded portion 23 for this purpose.

The U-shaped member 2 is provided with openings 24 through which the stems 19 extend.

C represents the center of gravity of each of the weights and the weighing mechanism is so designed that the centers of gravity of each weight will always be located between the respective guiding surfaces 5 and 10 which support the spool-shaped member 13 to which the weight is attached. In Fig. 1, the full lines show the parts in the position which they occupy when the weighing scale is fully loaded and also when there is no load thereon. The weights in the fully loaded position are in a vertical position as shown and may be adjusted vertically to the proper position along the stems 19. The dotted line position shown for one of the weights, illustrates the position which the weight occupies when the weighing mechanism has no load thereon. The operating member 1 is adapted to move upwardly when a load is placed upon the load platform of the weighing mechanism. This exerts an upward pull on the flexible elements 11 and rotates the spool-shaped members 13, the spool-shaped member 13 at the left being given a counter-clockwise movement and the spool-shaped member 13 shown at the right being given a clockwise movement. This movement also moves the members 13 vertically from the dotted line position to the full line position, shown in Fig. 1. The upward movement of the operating member 1 is resisted by the weights 21. As will be noted from an examination of Fig. 1, when there is no load on the load platform, the center of gravity is located close to the guide plate 5 and therefore most of the downward pull of the weights 21 is exerted on the flexible elements 6. However, as the load on the platform raises the operating member 1, the centers of gravity of the weights move over closer to the upwardly extending members 8 and therefore the downward pull of the weights is gradually transferred from the flexible elements 6 to the flexible elements 11, thereby offering a greater resistance to the upward movement of the operating member 1.

An indicating means is provided for indicating the weight of the load placed on the load platform of the weighing mechanism. This indicating means comprises a shaft 25 rotatably mounted in the U-shaped member. This shaft carries a gear 26 in an opening at the center of the U-shaped member, as best illustrated in Figs. 1 and 3. The opposite ends of the shaft 25 carry a pointer 27 fastened thereto by means of the thumb screws 28, or in any other suitable manner. A protecting cover 29 is fastened by means of screws 30 to the legs of the U-shaped member and this cover carries the curved indicating scales 31, fastened thereto by any means such as the screws 32. The pointers 27 are in alinement with each other and co-operate with the adjacent indicating scales 31, as best illustrated in Fig. 2. A rack 33 is fastened by means of a screw 34 to the bracket 35 which, in turn, is fastened by means of the screws 36 to the sleeves 10, as best illustrated in Figs. 1 and 3. This rack engages the gear 26 and as the operating member moves in a vertical direction, the shaft 25 is given a rotating movement by means of the rack 33 and the gear 26. Rotation of the shaft moves the pointer across the indicating scale to indicate the weight of the load on the load platform.

Obviously those skilled in the art may make various changes in the details and arrangement of parts without departing from the spirit and scope of the invention as defined by the claims hereto appended, and I wish therefore not to be restricted to the precise construction herein disclosed.

Having thus fully disclosed an embodiment of my invention, what I claim and desire to secure by Letters Patent of the United States is;—

1. Weighing apparatus comprising a fixed support, a movable element responsive to variations in load placed on the load platform of said apparatus, a weight supported by said support and element adapted to move in such a manner as to vary the amount of weight supported by said support and said element corresponding to variations in the load placed on the platform of said weighing apparatus, and indicating means responsive to the movement of said weight for indicating the weight of the load on said load platform.

2. Weighing apparatus comprising a fixed support, a movable member, a spool-shaped member having a pair of substantially cylindrical bearing surfaces and a weight eccentrically mounted with respect to said bearing surfaces, and flexible elements connected to said bearing surfaces and to said support and movable member for thereby supporting said eccentric weight by said support and movable member, the proportion of the amount of said weight supported by said support and movable member varying inversely as the amount of load placed on said weighing apparatus, 3. Weighing apparatus comprising a fixed support, a movable member, a spool-shaped member having a pair of substantially cylindrical bearing surfaces and a weight eccentrically mounted with respect to said bearing surfaces, and flexible elements connected to said bearing surfaces and to said support and movable member for thereby supporting said eccentric weight, the center of gravity of said weight always remaining between the points at which said flexible elements are attached to said support and said movable member.

4. Weighing apparatus comprising a fixed support, a movable member, a spool-shaped member having a pair of substantially cylindrical bearing surfaces and a weight eccentrically mounted with respect to said bearing surfaces, flexible elements connected to said bearing surfaces and to said support and movable member for thereby supporting said eccentric weight, and means for registering the amount of load on the platform of said weighing apparatus.

5. Weighing apparatus comprising a fixed support, a movable member, a spool-shaped member having a pair of substantially cylindrical bearing surfaces and a weight eccentrically mounted with respect to said bearing surfaces, flexible elements connected to said bearing surfaces and to said support and movable member for thereby supporting said eccentric weight, and means for registering the amount of load on the platform of said weighing apparatus comprising a pointer and a rack and gear connection between said pointer and a movable element of said weighing mechanism.

6. A weighing apparatus comprising a pair of rockable members actuated by an element of the weighing mechanism which is adapted to be moved upwardly by mechanism connected to the load platform of said weighing apparatus, said rockable members being bodily movable, and means to resist movement of said rockable members.

7. Weighing apparatus comprising a load responsive element, flexible means connected thereto, a pair of rockable elements supported by flexible means extending upwardly, and means for resisting rotation of said rockable elements.

8. Weighing apparatus comprising a load responsive element, a fixed support, a bodily movable rockable element supported by said load responsive element and said support, and means for resisting rotation of said rockable element.

9. Weighing apparatus comprising a fixed support, a movable element responsive to variations in loads placed on the load platform of said apparatus, weights supported by said support and element adapted to move in such a manner as to vary in opposite directions the amount of weight supported by said support and said element corresponding to variations in the load placed on the load platform of said weighing apparatus, and indicating mechanism responsive to the movement of said weights for indicating the weight of the load on said load platform.

10. Weighing apparatus comprising a fixed support, a movable element responsive to variations in the load placed on the load platform of said apparatus, a pair of members having substantially cylindrical surfaces, flexible elements connected to the cylindrical surfaces of each member and to said support, flexible elements fastened to said cylindrical surfaces and said movable element, and weights for resisting rotation of said members, said first and last mentioned flexible elements being arranged on opposite sides of their respective members.

11. Weighing apparatus comprising a fixed support, a movable member, spool-shaped members each having a pair of substantially cylindrical bearing surfaces, said support and movable member each having flexible elements attached thereto and to one of the cylindrical bearing surfaces of each spool-shaped member, and means to resist rotation of said spool-shaped members, said spool-shaped members being suspended between the flexible elements attached thereto.

12. Weighing apparatus comprising a fixed support, a movable member, spool-shaped members each having a pair of substantially cylindrical bearing surfaces, flexible elements connected to said bearing surfaces and to said support and movable member, and a weight attached to each of said spool-shaped members for resisting rotation thereof, all of said flexible elements supporting said spool-shaped members and said weights.

13. Weighing apparatus comprising a fixed support, a movable member, spool-shaped members each having a pair of substantially cylindrical bearing surfaces, flexible elements connected to said bearing surfaces and to said support and movable member, and a weight attached to each of said spool-shaped members for resisting rotation thereof, said flexible elements supporting said spool-shaped members and said weights, the center of gravity of each of said weights being located, at all times during the use of said apparatus, between the points of support for the spool-shaped member to which it is attached.

14. In a weighing apparatus, the combination with a fixed support, of a movable element responsive to load variations on said weighing apparatus, a rotatable eccentricaly weighted member supported between said support and element, and operative connections between said weighted member and said support and element whereby said weighted member is actuated when the movable element is moved in response to load variations.

15. In a weighing apparatus, the combination with a fixed support, of a movable element responsive to load variations on said weighing apparatus, and a rotatable eccentrically weighted member supported between said support and element and movable by upward movement of said element.

16. In a weighing apparatus, the combination with a fixed support, of a movable element responsive to load variations on said weighing apparatus, and a rotatable eccentrically weighted member supported between said support and element, by means of flexible elements attached to said support and element.

17. In a weighing apparatus, the combination with a fixed support, of a movable element spaced horizontally therefrom, a rotatable eccentrically mounted weight arranged between said element and support and supported thereby by means of flexible elements, said weight being supported entirely by said support and element and being movable across the space therebetween to transfer the effective pull of said weight to either said support or element as said element moves relatively to said support.

18. In a weighing apparatus, the combination with a fixed support, of a movable element spaced horizontally therefrom, a rotatable eccentrically mounted weight arranged between said element and support and supported thereby by means of flexible elements, said weight being supported entirely by said support and element and being movable across the space therebetween to transfer the effective pull of said weight to either said support or element as said element moves relatively to said support, said element having means movable therewith for actuating an indicating mechanism.

19. In a weighing apparatus, the combination with a U-shaped bracket having the legs thereof extending vertically, a flexible element attached to each leg, a load responsive member arranged between said legs having a pair of flexible elements attached thereto, a pair of rotatable members, one of which is supported between one leg and said load responsive member and the other of which is arranged between said other leg and said load responsive member, said rotatable elements being supported by said flexible elements on said legs and load responsive member, and means for resisting rotation of said rotatable members.

20. In a weighing apparatus, the combination with a support, an element movable upwardly in response to an increased load on said apparatus, and a rotatable eccentrically mounted weight suspended between said support and element by flexible members, said weight resisting upward movement of said element.

In testimony whereof I have signed my name to this specification on this 12th day of September, A. D. 1929.

JOHAN HENDRIK de IONGH.